United States Patent [19]
Hooks et al.

[11] 3,713,687
[45] Jan. 30, 1973

[54] POOR MAN'S CAMPER FOR STATION WAGONS

[75] Inventors: Claud H. Hooks; Margaret W. Hooks, both of Albuquerque, N. Mex.

[73] Assignee: Camper Improvements Company, Albuquerque, N. Mex.

[22] Filed: July 14, 1971

[21] Appl. No.: 138,567

[52] U.S. Cl. ...............296/23 R, 296/26, 296/137 B
[51] Int. Cl. ...............................................B60p 3/34
[58] Field of Search....................296/23 R, 26, 137 B

[56] References Cited

UNITED STATES PATENTS

| 3,212,812 | 10/1965 | Kurtz | 296/137 B |
| 3,202,457 | 8/1965 | Wiley | 296/137 B |
| 3,053,562 | 9/1962 | Farber | 296/137 B X |

*Primary Examiner*—Philip Goodman

[57] ABSTRACT

The "Poor Man's Camper for Station Wagons" is essentially a rectangular shaped box, that has no bottom, mounted on top of a modified Station Wagon. A Station Wagon as defined in Webster's Dictionary is "an automobile that resembles a sedan but has no separate luggage compartment and has a top (that is) less rounded in back, a tail gate, and one or more rear seats that readily lift out or fold to facilitate light trucking." The Station Wagon is modified such that a section of it's top over the back seat is cut out. This cut out section of the top is called the "removable roof section" and it can be taken out and stored when the Poor Man's Camper is used or it can be replaced and locked in position when the Poor Man's Camper is removed and the Station Wagon then used as a regular family or business Station Wagon. The Poor Man's Camper is mounted on top of the Station Wagon such that it provides an air/water tight seal with the top of the Station Wagon with latches joined to secure it into its traveling configuration. It is hinged at one end such that the other end may be raised and secured in position for the camping configuration. Curtains are dropped from the lid and secured in position to provide privacy and protection from the elements of weather. The back seat is folded down to provide the floor on which a person stands while undressing, dressing or cooking meals, etc. The Station Wagon's permanent rear floor bed plus any desired portion of the folded down floor is used as a surface for bedding to sleep on.

1 Claim, 21 Drawing Figures

PATENTED JAN 30 1973 3,713,687

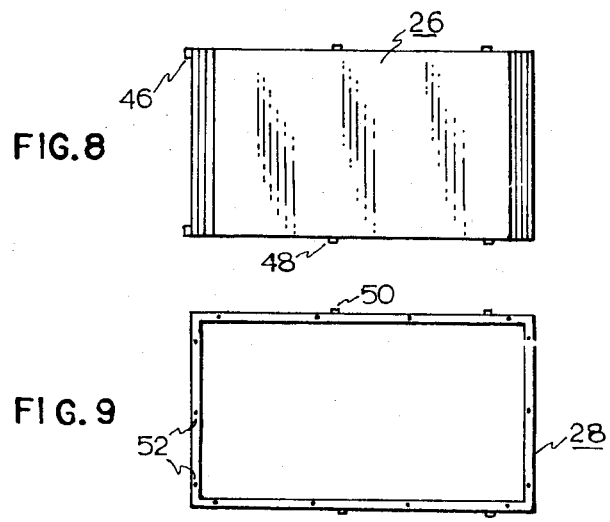
FIG. 8
FIG. 9
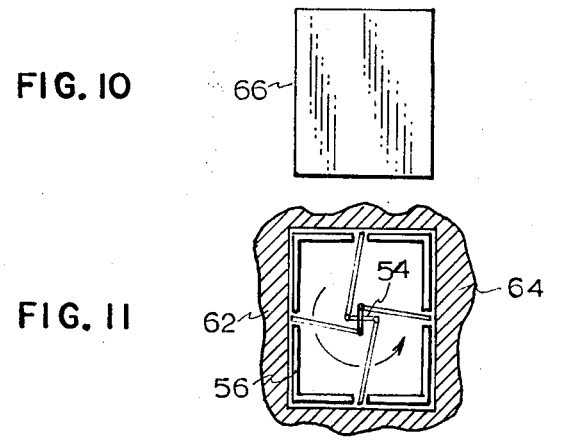
FIG. 10
FIG. 11
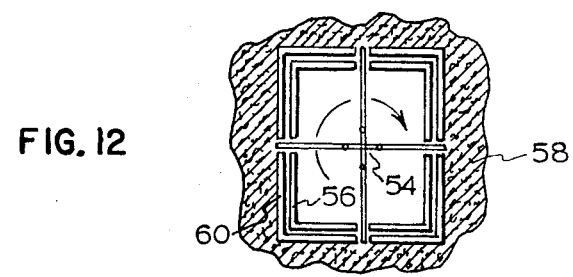
FIG. 12
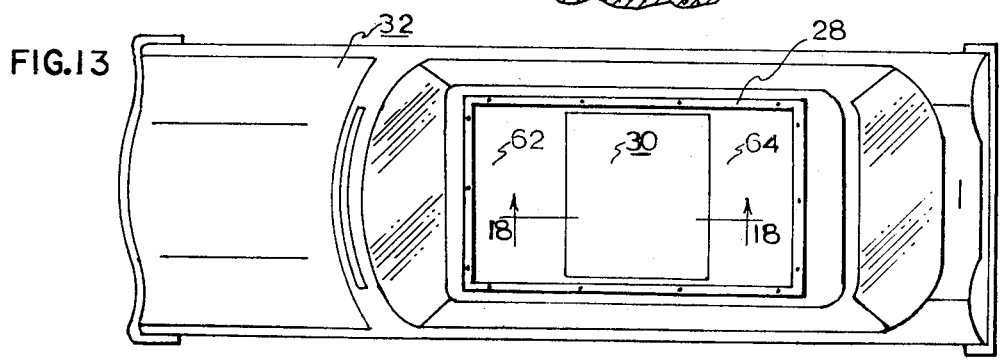
FIG. 13

POOR MAN'S CAMPER FOR STATION WAGONS

DESCRIPTION OF THE PRIOR ART

There are many varieties of recreational vehicles on the market today but a great majority of the public can not financially afford to purchase one and/or to store it for the months of the year that it is not being used, therefore many means have been devised to modify conventional vehicles and permanently installing an extensible and retractable roof thereon, thereby permanently altering the structural integrity of the vehicle with no thought of providing a means of temporarily reconverting the vehicle back to its primary use as a family/business vehicle for that great majority of the year that there is no requirement for a recreational vehicle but in which period there is a great need for a family/business vehicle. In addition to seriously, and permanently, altering the structural integrity of the vehicle body, the extensible and retractable roof assemblies have been permanently mounted on the vehicle roof; in fact, in the past, once the vehicle has been modified by creating an aperture in the roof the extensible and retractable roof has to be left on permanently to provide a roof for the vehicle ever afterwards. Some such attempts at providing an extensible and retractable roof have had to employ electric or hydraulic devices to raise and lower the roof because of the great weight and bulk of the extensible and retractable roof. (See U.S. Pat. No. 3,053,562 issued Sept. 11, 1962, to H. Farber as an example). This and some other attempts have been so complicated that they lie outside the financial capability of all but a very few because the roofs and related mechanisms have to be manufactured and in some cases installed at a factory or a body shop. (See U.S. Pat. No. 3,202,457 issued Aug. 24, 1965 to J.R. Wiley as an example). Still other attempts have been relatively simple and, in general, within the capability of the average person but here again the structural integrity of the vehicle has been seriously impaired, the extensible and retractable roof has been permanently mounted on the vehicle roof and no provisions have been made to ever temporarily convert the vehicle back to its original utility use as a conventional family/business vehicle. (See U.S. Pat. No. 3,212,812 issued Oct. 19, 1965 to M.E. Kurtz as an example.) It is, therefore, apparent that what is needed in the recreational vehicle area is a simple adjunct to a modified Station Wagon that will readily allow the modified vehicle to be used as a conventional family/business vehicle or a recreational vehicle as desired; subject Station Wagon being modified such that there is little, if any, loss in the vehicle's structural integrity and with no visual difference readily apparent in the Modified Station Wagon from that of a like, but unmodified, Station Wagon when subject modified Station Wagon is being used as a family/business car. An 'Adjunct' as defined in Websters Dictionary is "- - - Something joined or added to another thing, but not essentially a part of it. - - -," in other words a temporary attachment.

OBJECTIVES OF THE PRESENT INVENTION

One of the objects of this invention is to provide a Station Wagon that has been modified for use as a recreational vehicle and that can be easily reconverted back to a conventional family/business car with no visual difference readily apparent and with no reduced structural integrity in said Station Wagon from a like, but unmodified, Station Wagon; such modification and reconversion being within the capability of one man without the use of any highly specialized tools, equipment or special skills.

Another object of this invention is to provide a modified Station Wagon that has a 'removable and replaceable roof section' that can be unlocked and temporarily removed from the modified Station Wagon when an 'extensible, retractable and removable lid' and its 'base' are temporarily mounted on subject Station Wagon roof and which 'removable and replacable roof section' can be replaced and locked into position when the 'extensible, retractable and removable lid' is removed from the roof of subject Station Wagon; the construction and weight of the 'removable and replacable roof section' being such that one man can remove and/or replace it without the use of any tools.

Another object of this invention is to provide a modified Station Wagon that has a rectangular frame 'base' temporarily mounted on its roof, the top surface of such base when so mounted lies in one horizontal plane, the bottom surface of which makes an airtight and watertight contact with the contoured surface of subject Station Wagon roof; with provisions for allowing the escape of any moisture that might otherwise accumulate on roof inside the confines of the 'base'; provisions for temporarily attaching the 'base' to the Station Wagon roof; the design and dimensions of such 'base' giving the Station Wagon an elongated, and thus lower, appearance such as given by some luggage racks such that some owners may desire to have the base temporarily mounted on subject Station Wagon roof for extended periods even though the 'extensible, retractable and removable lid' has been removed and the 'removable and replaceable roof section' has been replaced and locked into position.

A further object of the present invention is to provide a modified Station Wagon that has an 'extensible, retractable and removable lid'; such 'lid' being temporarily hingedly attached to its 'base' which is temporarily mounted on subject Station Wagon's roof; the bottom surface of the walls of such 'lid' making an airtight and watertight closure with its 'base' when 'lid' is in retracted position; provisions for raising 'lid' to its extended position and firmly securing it into place; all exercises envolved being within the capabality of one man.

A further object of this invention is to provide a modified Station Wagon, by design, that has storage area on the permanent roof section that lie within the confines of the 'base' and covered by the 'extensible, retractable and removable lid' such that items stored thereon are available to occupants in the modified Station Wagon at any time subject Station Wagon is being used as a recreational vehicle regardless of whether the 'extensible, retractable and removable lid' is retracted or extended.

Still another object of this invention is to provide a modified Station Wagon, that has an 'extensible, retractable and removable lid' plus its 'base', the design of the 'base' and lid' being such that when they are temporarily installed on the roof of the modified Station Wagon and the 'lid' is in its retracted position there is added less than 4 square feet of vertical front area to the vehicle, less than 7 square feet of vertical side area to either side of the vehicle, and still leaves the overall vertical height of the recreational vehicle under 6 feet; but such that when the 'extensible, retractable and removable lid' is in its extended position over 6 feet of covered vertical standing height is provided for persons standing on the floor bed of the modified Station Wagon, with privacy provided for dressing, undressing, cooking meals etc. as well as protection from the elements of the weather.

Another object of this invention is to provide a Station Wagon, by design, that has an 'extensible, retractable and removable lid' and a 'base' for such 'lid' that are of such simplicity, weight and shape that one man, using a screwdriver as the only tool required, may remove them from their temporary installation on the modified Station Wagon roof and store them by hanging them on a nail on the garage wall or standing them upright on the floor by a wall where they will take up as little as 3.666 square feet of floor area; but yet, a man using a screwdriver as the only tool required, can temporarily reinstall such items on the subject Station Wagon thereby temporarily converting subject Station Wagon to a recreational vehicle but in doing so has added less than fifty pounds to the gross weight of subject vehicle.

BRIEF SUMMARY OF INVENTION

The purpose of the "Poor Man's Camper" is to provide a means of easily and inexpensively converting a modified Station Wagon into a recreational vehicle; i.e., a camper. And because cost was, and is, a prime consideration in this invention, the modified Station Wagon can be easily, and without cost, converted back to it's primary use as a luxury family car or business car. The Poor Man's Camper is to be used as an adjunct to Station Wagons; that is to those vehicles which have a rear seat that folds down to extend the forward length of the rear floor bed. To further clarify what we refer to as a Station Wagon we use the definition as set forth in Webster's Dictionary which states: "Station Wagon - - - an automobile that resembles a sedan but has no separate luggage compartment and has a top less rounded in back, a tail gate, and one or more rear seats that readily lift out or fold to facilitate light trucking." The Station Wagon must be modified, or manufactured, such that a desired section of the roof over the rear seat can be removed at will. The Poor Man's Camper consists basicly of two parts: it's 'base' which is attached to the top of the Station Wagon, and it's 'lid' which is hinged to one end of it's 'base'. The removable section of the Station Wagon roof is removed and stored before originally attaching the Poor Man's Camper 'base'. The 'base' is attached to the roof of the Station Wagon with metal screws. The 'lid' is then hinged to one end of the 'base' and the four latches (two on either side) between the 'base' and the 'lid' are joined and closed. This is the traveling configuration of the Poor Man's Camper. When stationary at a camp site, the rear seat of the Station Wagon is lowered to extend the floor bed, the 'lid' is unlatched, raised and secured in place. The curtains are dropped from the 'lid' to the 'base' and fastened in place, thereby providing sufficient room and privacy in the Station Wagon to stand up to full height to dress and undress, to cook meals, etc. and to sit behind the front seat and eat meals off of the Poor Man's Camper table which is resting on top of the back rest of the front seat. Sleeping space in the Station Wagon has not been altered in any way by the attachment of the Poor Man's Camper. Storage space in the Station Wagon has been increased considerable by the attachment of the Poor Man's Camper as that section of the roof of the Station Wagon which has not been removed that is within the confines of the 'base' is available for storage of such items as a folding stove, fuel, non-perishable foods, liquids, etc. To convert the Station Wagon back for its primary purpose the 'lid' is unhinged from its 'base' and stored. The 'base' can be removed or left attached as desired, and the removable section of the Station Wagon roof is replaced and secured in position.

BRIEF DESCRIPTION OF THE DRAWING VIEWS

FIG. 1; Poor Man's Camper 'lid' 26

FIG. 2; Poor Man's Camper 'base' 28

FIG. 3; Removable section of Station Wagon roof 30

FIG. 4 A typical Station Wagon with removable roof section taken out.

FIG. 5 A typical Station Wagon with its removable roof section taken out and with the Poor Man's Camper 'base' installed.

FIG. 6 A typical Station Wagon with its removable roof section taken out, the Poor Man's Camper 'base' installed on the Station Wagon and the Poor Man's Camper 'lid' installed on it's 'base'. This is the 'traveling configuration' of the Poor Man's Camper mounted on Station Wagon.

FIG. 7 A typical Station Wagon with Poor Man's Camper and Station Wagon in their 'stationary configuration'. The Poor Man's Camper 'lid' 26 has been raised from one end of it's 'base' 28 and secured in place by attaching the bottom ends of lid supports 40 to the base 28. The Poor Man's Camper curtains 42 have been dropped from the lid 26; and attached to the base 28. The Poor Man's Camper table 44 has been placed on top of the back rest of the front seat and secured in place to each front door. The Station Wagon floor bed 38 has been extended forward by folding down the rear seat 34 and folding forward the extension 36; attached to the rear of the rear seat 34. (Different makes of Station Wagons have different methods of extending the floor bed forward as the back seat is folded down but each provides a suitable floor for the Poor Man's Camper use.)

FIG. 8 Looking down on the top of the Poor Man's Camper lid 26. This shows the location of installation of the two hinges 46 and of the four latches 48.

FIG. 9 Looking down on the top of the Poor Man's Camper base 28. This shows the location of installation of the bottom section of the four latches 50, and the vertical holes 52 through the center of the base 28 through which metal screws are inserted to be screwed into roof of Station Wagon.

FIG. 10; Looking down on top of removable roof section 30. 66 is the metal portion of the roof that has been cut out of roof.

FIG. 11., Looking down on removable roof section 30 with metal top 66 removed to expose frame 56 on which metal top 66 is ordinarily mounted. This view also shows locking mechanism 54 with it's four plungers retracted to allow removable roof section 30 to be lifted out. Roof section 62 and roof section 64 are shown to the side of the exposed portion of the removable roof section 30.

FIG. 12 Looking down on removable roof section 30 with metal top 66 removed to expose frame 56 and locking mechanism 54. Also removed are metal roof section 62 and 64 to expose roof frame 60 and Station Wagon ceiling 58 to which roof frame 60 is permanently attached. This time the locking mechanism 54 has been turned to insert plungers into holes in wall of roof frame 60 thereby locking removable roof section 30 securely in traveling configuration for the pleasure/business Station Wagon.

FIG. 13 Looking down on the top of a typical Station Wagon which has been modified, or manufactured, such that a portion of it's roof is now a removable roof section 30. The Poor Man's Camper base 28 is shown installed on top of the Station Wagon. The permenant roof section that is left within the confines of the area surrounded by the base 28 is designated roof section storage area 62 and roof section storage area 64.

FIG. 14 is a side view of the frame of the Poor Man's Camper lid 26. The two hinges 70 are shown mounted on the frame 68.

FIG. 15 is a front (or rear) view of the frame of the Poor Man's Camper lid 26 showing installation of the two hinges 70 mounted on the frame 68.

FIG. 16 is a side sectional view of removable roof section 30 which exposes locking mechanism 54 with it's plungers in the retracted position prior to section being replaced in Station Wagon roof.

FIG. 17 is a side sectional view of Station Wagon roof that exposes metal roof top sections 62 and 64, the permanent roof frame 60 and the rubber molding 72 that is mounted around the entire circumference of the roof frame 60 and the edge of the metal roof where the metal roof is permanently secured to the roof frame 60.

FIG. 18 is a side sectional view showing removable roof section 30 locked into traveling position by having the plungers of locking mechanism 54 inserted into roof frame 60.

FIG. 19 is a side view of one of the two Poor Man's Camper lid supports 40. It is a half inch angle iron. At each end one side of the angle iron has been cut off for a distance of 1 inch and a hole 74 drilled in one end and a notch 76 cut out of the other end. The lid supports 40 are securely attached to the lid 26 by inserting a screw in hole 74 and screwing it into inside corner of lid that is to be raised. The notch on the other end of the lid support 40 is placed around a bolt on base 28 and a wing nut is tightened against lid support to hold it firmly in place.

FIG. 20 is a miniature view of the curtains 42 for the Poor Man's Camper. Side curtains 78 and 82 each have two windows with nylon screens and each window has a tie-up closure. The rear curtain 80 has one window with nylon screen and a tie-up closure. Side curtains 78 and 82 are attached to the rear curtain 80 by zippers 84. This allows any one or all curtains to be up or down as desired at any time.

FIG. 21 This is a bottom view of the Poor Man's Camper table 44. The table is made of ⅜ inch plywood board to which are permanently mounted two 2 inch brackets 86 and four slide guides 88. In each set of two slide guides are slid two sliding sticks 90. On the outside end of each sliding stick 90 is permanently mounted a very thin 1 inch bracket 92. When in use, the bottom side of the table is placed on top of the back rest of the front seat with the brackets 86 pressing against the back of the back rest of the front seat. The sliding sticks 90 are slid sideways until the brackets 92 on their ends can be placed down between the front door window glass and the inside door frame. This holds the table securely in place.

DETAILED DESCRIPTION

A Station Wagon can be easily and inexpensively converted to a recreational type vehicle (a camper) by first cutting out that rectangular section of the roof that is directly over the inside area of the Station Wagon that is measured lengthwise of the car from the back of the front seat to the back of the back seat, and with a width that is determined by measuring an equal distance, as desired, from the center of the roof toward each rear side door. This cut-out section of the roof is shown in drawing FIGS. 3, 10, 11, and 12.

Figure 17:
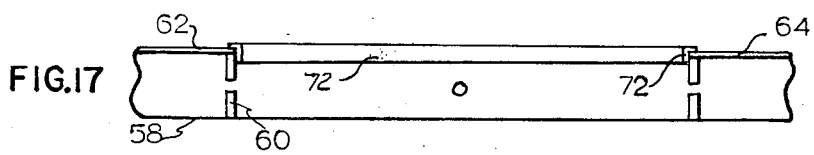
Figure 18:
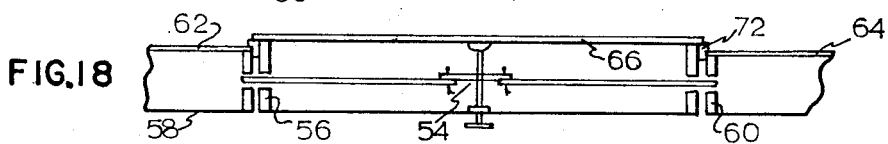

After the metal roof section 66 has been cut out the Station Wagon ceiling is refinished around the opening by installing hard wood frame 60 (shown in drawing FIGS. 12 and 17) and then mounting rubber molding 72 (shown in drawing view FIGS. 17 and 18) around entire circumference of roof opening where frame 60 is secured to metal roof. The edge of the ceiling material 58, where it joined the cut out section, is then permanently secured to the bottom side of roof frame 60.

Figure 16:
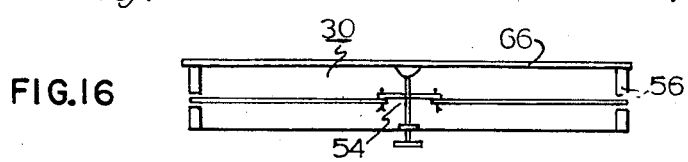

The removable roof section 30 is made by mounting a hard wood frame 56 on to the bottom of metal roof section 66 that was cut out. This metal roof section is shown in drawing views FIGS. 10 and 16. The removable roof section frame is shown in drawing views FIGS. 11, 12, 16, and 18. Next mounted to the metal roof section is locking device 54 shown in drawing views FIGS. 11, 12, 16, and 18. This devise is made such that it's shaft can be rotated 90° only. At the middle length of the shaft are permanently welded four arms, each one inche long. The arms are welded perpendicular to the shaft and at 90° to each adjacent arm. At the end of each arm is drilled a small vertical hole through which a cotter key is inserted to hinge attach the arm to the plunger. The plungers are metal rods, one end of which is rounded to facilitate easy slipping into hole in roof frame 60 shown in drawing FIGS. 12, 17, and 18. The plungers are shown in drawing views FIGS. 11, 12, 16 and 18. The other end of the plunger rod has a hole drilled in it through which the cotter key is placed to hinge attach the plunger to the shaft arm. All plungers are placed in their position in holes in the removable roof section frame 56 and then each is hinge attached to it's mate shaft arm by inserting the cotter key into the two holes and bending up one side half of the cotter key. The length of each plunger is such that when the shaft of the locking device 54 is turned to a fully retracted position the plungers are drawn inwardly such that they do not stick out of holes in removable roof section frame 56. (This is shown in drawing FIGS. 11 and 16.) When the shaft of the locking device 54 is turned 90 degrees in the reverse direction the plungers are sent outwardly to be inserted in the holes in roof frame 60 (shown in drawing FIGS. 12 and 18.) The holes in roof frame 60 are drilled such that they slope downward at 10° so that when the plunger enters the hole it is guided gently downward as it is pushed in. This causes the entire removable roof section 30 to be lowered with a slight pressure against the rubber molding 72 and creates a water tight and air tight seal.

After removing the removable roof section 30 the Poor Man's Camper base (2) is installed on the roof of the Station Wagon with metal screws. The Poor Man's Camper base 28 is shown in drawing FIGS. 2, 5, 9, and 13. The base 28 is installed on the roof such that its two ends are an equal distance from the opening in the roof and its sides are equal distance from the opening in the roof. After installing the base 28 then the lid 26 is installed on its base 28 by securing the two hinges to the base 28. The lid 26 is shown in drawing FIGS. 1, 6, 7, and 8. The hinges are shown in drawing FIGS. 8, 14, and 15. To put the Camper in its traveling configuration the two parts of each of the four latches 48 and 50 are joined and closed. The latches are shown in drawing FIGS. 8 and 9.

Figure 19:
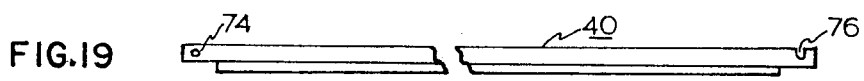
Figure 20:
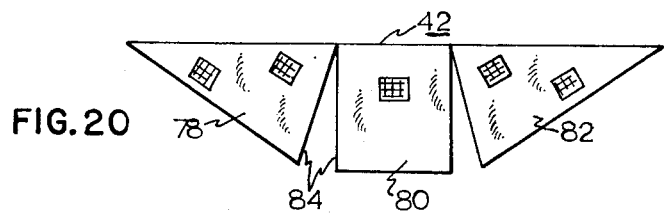
Figure 21:
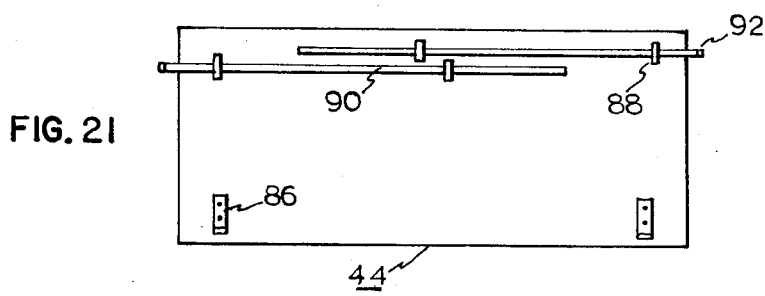

To put the Station wagon and the Poor Man's Camper in their stationary camping configuration the Station Wagon floor bed 38 is lengthened by folding down the rear seat 34 and the extension 36 that is attached to back of seat 34. The folded down extensions are shown in drawing FIG. 7. Some Station Wagons have a different mechanism for extending the floor bed toward the front seat, however in all cases it consists of folding down the back rest of the rear seat and the floor bed is then completed to full length either by an attached extension between the existing floor bed and the back of the back rest of the back seat or an extension that folds forward from it's hinged position at the top of the back rest of the backseat. In either case, adequate flooring is available to stand on when cooking or dressing in the Poor Man's Camper. When the floor bed is needed for sleeping the bedding that is rolled up toward the rear of the Station Wagon is rolled forward over the floor area that previously was the standing area. After the floor bed has been extended the four latches 48 and 50 are opened and the lid 26 is raised and secured in place by securing the two lid supports 40 in place. The lid supports 40 are shown in drawing FIGS. 7 and 19. Then the Poor Man's Camper curtains 42 are dropped from the lid 26 and secured to the base 28. The Poor Man's Camper curtains 42 are shown in drawing FIGS. 7 and 20. The Poor Man's Camper table 44 is then placed on the top of the back rest of the front seat and secured in place by sliding the two sliding sticks sideways until the bracket on the end of each sliding stick can be placed down in the door frame between the glass and the inside portion of the door frame. This secures the Poor Man's Camper table into place. The Poor Man's Camper table is shown in drawing FIGS. 7 and 21. This completes the placing of the Poor Man's Camper in the camping configuration. Meals are cooked on a folding stove that rests on roof storage area 64 shown in drawing FIG. 13. Also resting on roof storage area 64 is a plastic dish pan used in washing dishes, a 4 gallon collapsable plastic water container and various kitchen utensils. On roof storage section 62 (shown in drawing FIG. 13) rest various items of non-perishable foods, silverware, dishes, stove fuel, etc. As the meal is cooked it is placed on the Poor Man's Camper table 44. Individuals eating at the table sit on the extended floor bed with their feet in the normal foot space in front of the rear seat.

It is anticipated that in commercial manufacture of the Poor Man's Camper that the 'base' 28 is made of hard rubber molded such that its bottom surface fits the curvature of the Station Wagon roof and it's top surface is a perfectly flat horizontal surface. A strong aluminum strip is mounted on its entire top surface. Vertical holes are drilled through the aluminum strip and the molded rubber and then metal screws are inserted in these holes and screwed into corresponding holes in the roof of the station Wagon. The 'lid' 26 will be molded of fiber glass material. A foam rubber strip will be glued to its entire bottom surface such that when it is secured to it's 'base' a water tight and air tight closure is made between the 'lid' and it's 'base'. The two hinges will be installed to hinge one end of the lid to the corresponding end of the base. Either end can be chosen. Four latches will also be installed; two halves on both out sides of the base and their corresponding two halves on both sides of the lid.

The Poor Man's Camper can be manufactured to specifications such that the Camper could be available in any desired length, width and height. A length of 7 feet, a width of 4 feet and an overall height of 1 foot are the dimensions used in building the prototype Poor Man's Camper and those dimensions appear to be near optimum for most Station Wagons now in use or now being manufactured. However the dimensions can be varied to meet a particular need. The height dimension of the lid can be varied in manufacture from the nine inches used on the prototype to a minimum such that the lid would consist merely of a sheet of fiber glass board with no walls, to wall heights of any reasonable dimension. At the same time the vertical height of the base can be manufactured to any desired dimension; to a height that would comprise the entire wall of the Camper or to the thinest base possible to provide a perfectly flat horizontal surface for the lid to rest on. This thin base might be desireable for a majority of Station Wagon owners in that it could be left permanently attached to the top of the Station Wagon and would enhance the looks of the Station Wagon such as some luggage racks do, although the sole function of the base is to serve as a mount for the Poor Man's Camper lid. Varying dimensions will directly affect storage area, frontal wind attack surface, side wind attack surface, etc.

Figure 1:
Figure 2:
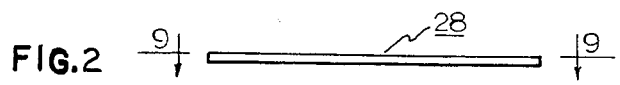
Figure 3:
Figure 4:
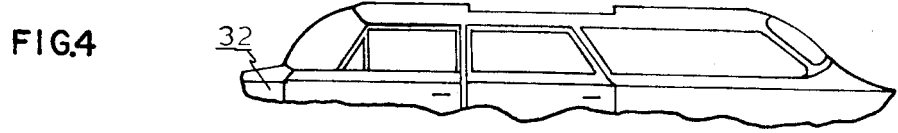
Figure 5:
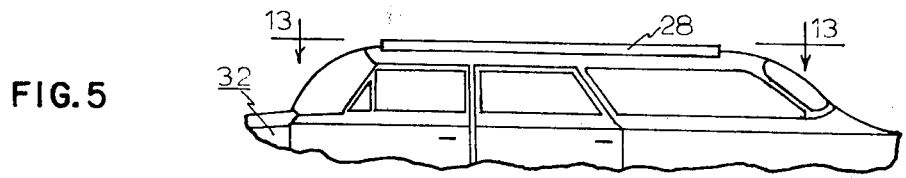
Figure 6:
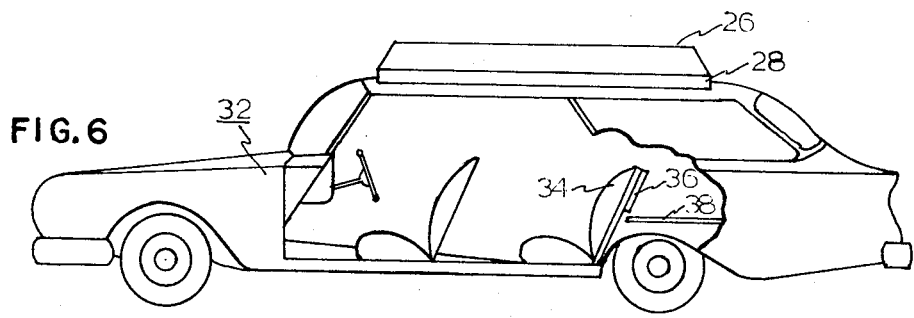
Figure 7:
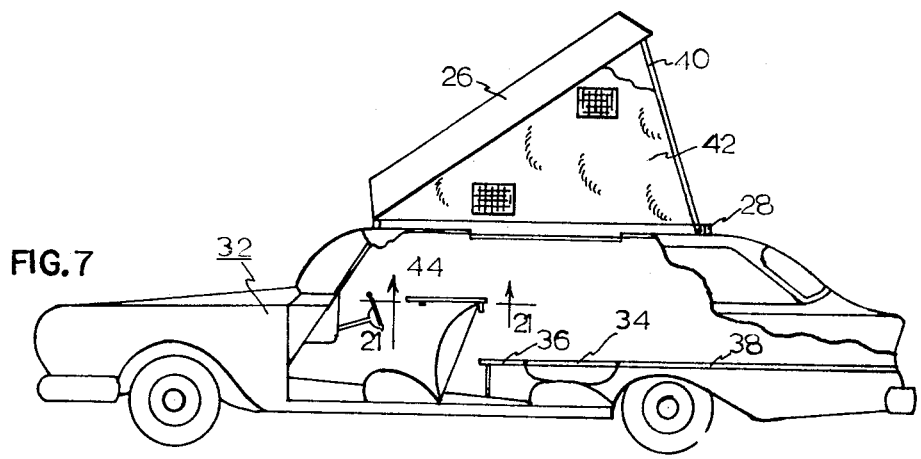
Figure 14:
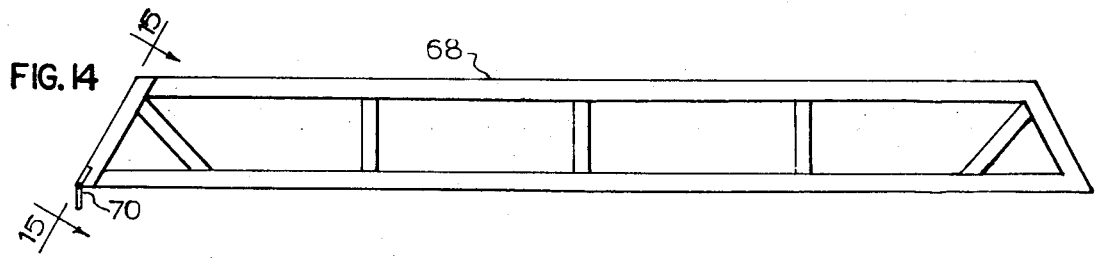
Figure 15:
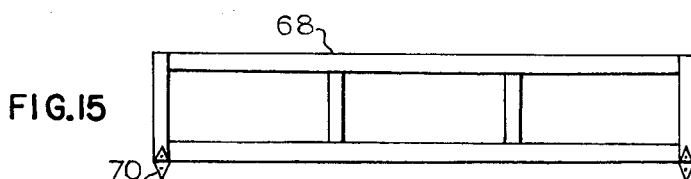

In building the prototype of the "Poor Man's Camper for Station Wagons" we used the cheapest materials available and 'workable' by the average handy man. Even so our Camper is completely servicable and safe. The base 28 is made of 2 inch×4 inch red wood shaped to the curvature of the Station Wagon roof yet providing a perfectly flat horizontal surface for the lid 26 to rest on. The lid frame 68 shown in drawing FIGS. 14 and 15 is made of 1.5 inch × 1.75 inch pine lumber. The frame member was chiseled out to accomodate installation of hinges 70 shown in drawing FIGS. 14 and 15 so that the hinges wouldn't interfere with the cover to be placed on the frame. The entire top and sides of the frame were then covered with ⅝ inch tempered masonite. All corners were calked where pieces of masonite come together to make lid 26 water tight and air tight. Then 1 inch angle galvanized tin was secured to the entire length of all edges where sides meet and sides meet roof. A 1 inch aluminum strip was secured on the bottom edge of all side walls of the lid 26. The top of the Poor Man's Camper curtains 42 are permanently mounted to the inside walls of the lid 26. They are rolled up and are held in storage place until needed by several rubber strips that are nailed permanently at one end on one side of the curtains and are then stretched across the rolled up curtain and fastened to a nail on the opposite side of the curtain. Each side curtain has two nylon screen windows and each window has a tie-up closure. The end curtain has one nylon screen window and a tie-up closure. Each side curtain is attached permanently to the rear curtain by means of a zipper that has it's permanent closure at the top. By means of these zippers, one, two or all three curtains can be down or up at any time as desired. The curtains have button holes spaced every 1 foot in their bottom edges. The base 28 has small screws spaced every one foot on its outside wall. The screw heads are placed in the button holes to secure the curtains in place. By having the curtains secured to the (outside) wall of the base 28 any rain or moisture on the outside of the curtain runs off the top of the car and not into the Camper. As the top of most Station Wagons have at least a small curvature length-wise and sidewise any moisture that might accumulate on top of the car inside the confines of the base 28 would accumulate at the inside corners of the base. To allow this moisture to run off, a small notch is cut into the bottom of the base 28 at each corner. The notch is cut, starting at the exact inside corner, so that the opening comes out at the opposite side of the base at a location 1 inch further toward the rear of the car than where it started out. By having the opening thus placed any air stream going by the hole, when the car is in forward motion, tends to suck air out of the car rather than driving air into the car. These notch holes can be plugged with soft rubber if desired when traveling. If the base 28 is to be left on permanently when the lid 26 is removed and the Station Wagon is being used as a pleasure/business Station Wagon the notch holes in the bottom of the base 28 should be left open so that rain can freely run off the top of the Station Wagon.

We claim:

1. A Station wagon that is modified such that it has a 'removable and replacable roof section,' said section being a framed rectangular section of the roof and ceiling that is directly over the inside area of subject Station Wagon that is measured lengthwise of the car, as desired, from the back of the front seat to the back of the back seat and with a width that is determined by measuring equal distances, as desired, from the transverse center of the roof toward each rear side door, said section having a suitable locking device installed therin which permits locking of said section back into aperture in subject Station Wagon's roof from whence it originated, locking device being operative from inside of vehicle only, said aperture being framed and provided with means of accepting 'removable and replacable roof section' into its locked position therewith in an airtight and watertight closure, said section to be used when subject Station Wagon is being used as a family/business car, said section not to be used when subject Station Wagon is being used as a recreational vehicle, a rectangular frame 'base' temporarily mounted on roof of subject Station Wagon such that each end of said 'base' is an equal distance from the aperture in the roof and each side of said 'base' is an equal distance from said aperture, length of frame 'base' being approximately two times the length of aperture measuring both lengthwise of the car, inside width of frame 'base' being only slightly wider than that of aperture, the top surface of said 'base' when temporarily mounted on the roof of subject Station Wagon lies in one horizontal plane, the bottom surface of which makes an airtight and water tight contact with the contoured surface of subject Station Wagon's roof, with provisions for allowing the escape of any moisture that might otherwise accumulate on that portion of the Station Wagon's permanent roof that lies within the confines of said 'base', a 'lid' for subject Station Wagon, said 'lid' being essentially a rectangular box with no bottom, the bottom surface of the walls of said 'lid' being exactly the same demensions as the top surface of said 'base', said 'lid' being temporarily hingedly attached to one end of the rectangular frame 'base', the bottom surface of the walls of said 'lid' forming a watertight and airtight closure with its 'base' when said 'lid' is in its retracted position, provision for latching said 'lid' to said 'base' thus providing a weatherproof temporary roof for subject Station Wagon when subject Station Wagon's 'removable and replacable roof section' has been taken out and stored temporarily, provision for storage space underneath said 'lid' and above permanent roof sections that lie within the confines of said 'base', such storage space being accessable to occupants of subject Station Wagon when said 'lid' is in either its retracted or extended position, provisions for temporarily raising one end of said 'lid' to an acute angle with its 'base' and placing it securely, but temporarily, in such extended position with provisions for providing privacy and protection from the weather elements by means of flexible curtains that are attached permanently to said 'lid' only, side curtains being zipper attached to rear curtain such that one, two, or all three curtains may be up or down at any one time as desired.

* * * * *